S. I. PRESCOTT.
VEHICLE SPRING SUSPENSION.
APPLICATION FILED NOV. 16, 1915.

1,183,320.

Patented May 16, 1916.

INVENTOR
Sydney I. Prescott

UNITED STATES PATENT OFFICE.

SYDNEY I. PRESCOTT, OF NEW YORK, N. Y.

VEHICLE SPRING SUSPENSION.

1,183,320.  Specification of Letters Patent.  Patented May 16, 1916.

Application filed November 16, 1915. Serial No. 61,738.

*To all whom it may concern:*

Be it known that I, SYDNEY I. PRESCOTT, a citizen of the United States, residing at New York, county of New York, and State of New York, have invented a new and useful Improvement in Vehicle Spring Suspension, of which the following is a specification.

This invention relates to an improvement in vehicle spring suspension, more particularly to that adapted for use on motor cars.

In motor car construction, the frame carrying the power plant and the body is carried by the front and rear axles with springs of various types interposed between said axles and said frame. Springs of a type common in the art are mounted fore-and-aft; that is to say, along the sides of the frame. All such springs, however, are subjected to stresses entirely foreign to their cushioning or body carrying function. Practically all of the fore-and-aft springs now in use at the forward end of a motor car frame are used for the purpose of trailing the front axle, so that the main leaves of the spring are subjected to fore-and-aft stresses which interfere with the performance of their main function. Moreover, such springs are rigidly secured to the front axle by means of clip bolts or equivalent fastening means, and this construction results in a twisting stress in the spring whenever one wheel rides over an obstruction and tilts the axle. When either front wheel rises in passing over an obstruction, the forward corner of the frame is kicked upward while the other three corners tend to remain in position. This results in a twisting stress in the frame itself. Moreover, the full weight of the springs is carried by the axle and must be lifted bodily whenever a wheel passes over an obstruction. Furthermore, in rounding corners, side stresses are set up in the springs which interfere with their main function. Springs of this type do not perform their main function with the high degree of efficiency that is desirable. In some installations, the rear springs are subject to the same stresses interfering with their main function; and in many installations, the rear springs are also used for driving purposes thus importing into the structure another undesirable feature.

The main object of the present invention is to overcome these defects and to so suspend a frame and the power plant and body carried thereby that the springs will perform only their cushioning function, other means being provided for absorbing the fore-and-aft and side stresses set up during the operation of the vehicle.

Another object is the utilization of cantaliver springs in connection with both the front and rear axles so that both axles are relieved as much as possible from unsprung weight, and so that both ends of the vehicle will ride with equal ease.

A further object is the production of a cantaliver spring structure provided with a compensator for resisting the upward thrust of the cantaliver spring at its fulcrum so that a greater percentage of the axle upkick will be absorbed by the spring and compensator and a lesser percentage transmitted to the frame.

A further object is the production of a structure of this general character in which vertically movable but laterally rigid radius rods are so mounted that the fore-and-aft and side stresses are absorbed by the radius rods and not transmitted to the spring which is left free to work in its normal planes undisturbed by any stresses foreign to the cushioning stresses that it is designed to absorb.

With these and other objects not specifically mentioned in view, the invention consists in certain parts, constructions and combinations which will be hereinafter fully described and then specifically set forth in the claims hereunto appended.

In the accompanying drawings, which form a part of this specification and in which like characters of reference indicate the same or like parts, Figure 1 is a general side elevation, partly in section, of a device constructed in accordance with the invention; Fig. 2 is a detail view, upon an enlarged scale, of the spring anchorage; and Fig. 3 is a side view of the same looking from the left in Fig. 2.

In carrying the invention into effect, there is provided a frame, an axle, a cantaliver spring interposed between the frame and the axle, a mount for the spring including movable connections between the spring and the frame, a universal connection between the spring and the axle, and means independent of the spring for relieving the same from fore-and-aft and from side stresses. In the best constructions, there is provided a cantaliver spring fulcrumed between its ends to the frame and having one end connected with the axle and the other floating, and a compensator connected with the floating end of the spring and with the frame and operative to resist upward thrust of the spring at its fulcrum. In the best constructions also, there is provided a radius rod connected with the axle and pivoted to the frame; and when a radius rod is used, one end of the cantaliver spring is connected with it, while the other is connected with the compensator. All of these elements may be varied in construction within wide limits.

The device selected to illustrate the invention is but one of many possible concrete embodiments of the same, and the invention therefore is not to be restricted to the precise details of the structure shown and described. Furthermore, certain parts of the invention are capable of use independent of other parts; and such independent use is contemplated.

Referring to the drawings, 4 indicates the side bar of the frame of a motor car and 5 indicates a rear axle supporting one end of the frame 4. Riveted or otherwise rigidly secured to the frame 4 is a bracket 6 having an integral outwardly extending horizontal shelf 7 which is turned up at its outer extremity to form a vertical plate 8. Supported in a suitable aperture in this plate 8 and in the main body of the bracket 6 is a pin 9. Pivoted upon the pin 9 is a radius rod 10 having near its outer end a flange 11 beyond which the radius rod is journaled in a saddle 12 mounted on the axle 5. The radius rod is provided with a nut 13 for holding the rod and saddle together. The radius rod is further provided with a projection 14 extending beyond the nut 13 and this projection 14 carries a pin 15 to which one end of a shackle 16 is secured. The other end of the shackle 16 is pivoted at 17 to one end of a cantaliver spring 18 which is fulcrumed between its ends to the pin 9 before referred to, this mounting being accomplished by means of spring clips 19 and a spring seat 20, the latter being provided with two depending lugs 21 each pivoted upon the pin 9. The other end of the cantaliver spring 18 is connected by a pin 22 to a shackle 23. The shackle 23 is connected by a pin 24 with a quarter-elliptic compensating spring 25. This compensating spring 25 is rigidly secured by means of spring clips 26 to the shelf 7 before referred to.

The spring suspension, as shown in Fig. 1, is arranged for use in connection with a rear or driving axle, but it is to be understood that the device can also be used in connection with the front axle by simply turning the whole device end for end with respect to the frame.

It will be understood that the radius rod 10 is a rigid rod and that all fore-and-aft stresses due to either the driving mechanism or to road obstructions will be transmitted, either through the flange 11 or the nut 13, to the radius rod and thence to the frame, so that none of these stresses are ever transmitted from axle to frame through the spring itself. It will be readily understood also that the bearing of the radius rod 10 in the saddle 12 is of sufficient length to prevent side sway of the frame, and that the spring is thereby entirely relieved from side sway stresses. It will be further readily understood that whenever the axle is tilted by the passage of one wheel over a road obstruction the radius rod 10, being journaled in the saddle 12, will not be turned or twisted but will be perfectly free to swing upwardly, carrying the adjacent end of the cantaliver spring 18 with it. It will thus be seen that the spring suspension is at all times free to move in its normal vertical planes undisturbed by any stresses foreign to the cushioning stresses.

Whenever a wheel passes over a road obstruction and the axle is kicked upward by the wheel, the radius rod will of course be kicked upward with the axle, and the radius rod in turn will kick up the end of the cantaliver spring 18 which is connected with it. As the end of the cantaliver spring connected with the radius rod moves upward, the spring is deflected and an upward thrust on the pin 9 is developed. The upkick of one end of the cantaliver spring 18, however, results in a downkick of the other or floating end, and this downkick of the floating end is resisted by the compensating spring 25. The down thrust on the floating end of the cantaliver spring 18 will exert, through the agency of the shackle 23, an equal down thrust on the compensating spring 25; and since this compensating spring is rigidly anchored to the frame adjacent the pin 9 and nowhere else, the thrust of the compensating spring will be downward at 9, or against or compensating for the upward thrust of the cantaliver spring 18 at the same point. The effective result of the use of this suspension therefore is the absorption of the upkick stresses by the spring suspension without imparting violent upkick to the frame itself. Different compensating spring suspension effects may be obtained either by varying the position of the spring anchorage with respect to the ends of the cantaliver spring, or by varying the relative strength of the cantaliver and compensating springs, or by both.

What is claimed is:

1. The combination with a vehicle frame, of an axle, a cantaliver spring interposed between said frame and said axle, a mount for the spring including movable connections between the spring and said frame and a universal connection between said spring and said axle, and means lying in the same vertical planes as the cantaliver spring and independent of the spring for relieving said spring from fore-and-aft stresses.

2. The combination with a vehicle frame, of an axle, a cantaliver spring interposed between said frame and said axle, a mount for the spring including movable connections between the spring and said frame and a universal connection between said spring and said axle, and means lying in the same vertical planes as the cantaliver spring and independent of the spring for relieving said spring from side stresses.

3. The combination with a vehicle frame, of an axle, a cantaliver spring interposed between said frame and said axle, a mount for the spring including movable connections between the spring and said frame and a universal connection between said spring and said axle, and means lying in the same vertical planes as the cantaliver spring and independent of the spring for relieving said spring from fore-and-aft and from side stresses.

4. The combination with a vehicle frame, of an axle, a cantaliver spring fulcrumed between its ends to the frame and having one end floating, a universal connection between the other end of said spring and the axle, and a compensator lying in the same vertical planes as the cantaliver spring and connected with the floating end of the spring and with the frame and operative to resist upward thrust of the spring at its fulcrum.

5. The combination with a vehicle frame, of an axle, a cantaliver spring fulcrumed between its ends to the frame and having one end connected with the axle and the other floating, and a compensator lying in the same vertical planes as the cantaliver spring and connected with the floating end of the spring and anchored to the frame at the spring fulcrum.

6. The combination with a vehicle frame, of an axle, a cantaliver spring fulcrumed between its ends to the frame and having one end connected with the axle and the other floating, and a compensating spring lying in the same vertical planes as the cantaliver spring and connected with the floating end of the cantaliver spring and anchored to the frame at the cantaliver spring fulcrum.

7. The combination with a vehicle frame, of an axle, a semi-elliptic cantaliver spring fulcrumed between its ends to the frame and having one end connected with the axle and the other floating, and a quarter-elliptic compensating spring lying in the same vertical planes as the cantaliver spring and connected with the floating end of the cantaliver spring and anchored to the frame at the cantaliver spring fulcrum.

8. The combination with a vehicle frame, of an axle, a semi-elliptic cantaliver spring fulcrumed between its ends to the frame and having one end connected with the axle and the other floating, and a quarter-elliptic compensating spring located below and connected with the floating end of the cantaliver spring and anchored to the frame at the cantaliver spring fulcrum.

9. The combination with a vehicle frame, of an axle, a rigid bracket carried by the frame, a cantaliver spring fulcrumed between its ends to the bracket and having one end connected with the axle and the other floating, and a compensator connected with the floating end of the spring and anchored to the bracket.

10. The combination with a vehicle frame, of an axle, a rigid bracket carried by the frame, a pin carried by the bracket, a cantaliver spring fulcrumed between its ends on the pin and having one end connected with the axle and the other floating, and a compensator connected with the floating end of the spring and rigidly anchored to the bracket adjacent the pin.

11. The combination with a vehicle frame, of an axle, a radius rod connected with the axle and pivoted to the frame, a cantaliver spring fulcrumed between its end to the frame and having one end connected with the radius rod and the other floating, and a compensator connected with the floating end of the spring and with the frame and operative to resist upward thrust of the spring at its fulcrum.

12. The combination with a vehicle frame, of an axle, a radius rod connected with the axle and pivoted to the frame, a cantaliver spring fulcrumed between its ends to the frame and having one end connected to the radius rod and the other floating, and a compensator connected with the floating end of the spring and anchored to the frame at the cantaliver spring fulcrum.

13. The combination with a vehicle frame, of an axle, a radius rod connected with the axle and pivoted to the frame, a cantaliver spring fulcrumed between its ends to the frame and having one end connected with the radius rod and the other floating, and a compensating spring connected with the floating end of the cantaliver spring and anchored to the frame at the cantaliver spring fulcrum.

14. The combination with a vehicle frame of an axle, a radius rod connected with the axle and pivoted to the frame, a semi-ellip tic cantaliver spring fulcrumed between its ends to the frame and having one end con nected with the radius rod and the other floating, and a quarter-elliptic compensating spring connected with the floating end of the cantaliver spring and anchored to the frame at the cantaliver spring fulcrum.

15. The combination with a vehicle frame, of an axle, a rigid bracket carried by the frame, a radius rod connected with the axle and pivoted to the bracket, a cantaliver spring fulcrumed between its ends to the bracket and having one end connected with the radius rod and the other floating, and a compensator connected with the floating end of the spring and anchored to the bracket.

16. The combination with a vehicle frame, of an axle, a rigid bracket carried by the frame, a pin carried by the bracket, a radius rod connected with the axle and journaled on the pin, a cantaliver spring fulcrumed between its ends on the pin and having one end connected with the radius rod and the other floating, and a compensator connected with the floating end of the spring and rigidly anchored to the bracket adjacent the pin.

17. The combination with a vehicle frame, of an axle, a saddle carried by the axle, a rigid bracket carried by the frame, a pin carried by the bracket, a radius rod journaled in the saddle and pivoted on the pin, a cantaliver spring fulcrumed between its ends on the pin and having one end connected with the radius rod adjacent the saddle and the other floating, and a compensator connected with the floating end of the spring and rigidly anchored to the bracket adjacent the pin.

18. The combination with a vehicle frame, of an axle, a cantaliver spring fulcrumed between its ends to the frame and having one end connected with the axle and the other floating, and a compensator independent of the frame and coöperative with the floating end of the spring arranged and adapted to resist upward thrust of the spring at its fulcrum.

In testimony whereof, I have signed my name to this specification in the presence of two subscribing witnesses.

SYDNEY I. PRESCOTT.

Witnesses:
 JAMES A. McCANN,
 ELIZABETH LOUISE RUSSELL.

Copies of this patent may be obtained for five cents each, by addressing the "Commissioner of Patents, Washington, D. C."